Jan. 20, 1953 C. D. WEST 2,625,722
FASTENER
Filed Aug. 20, 1949
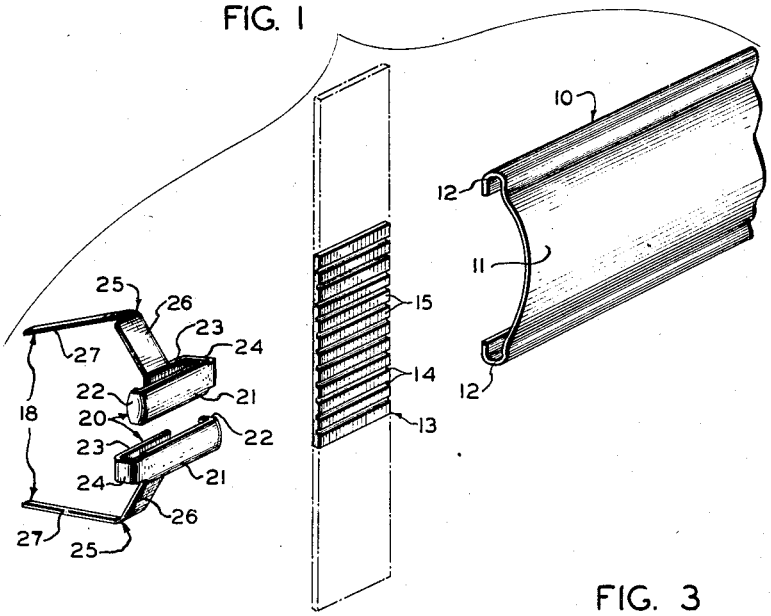
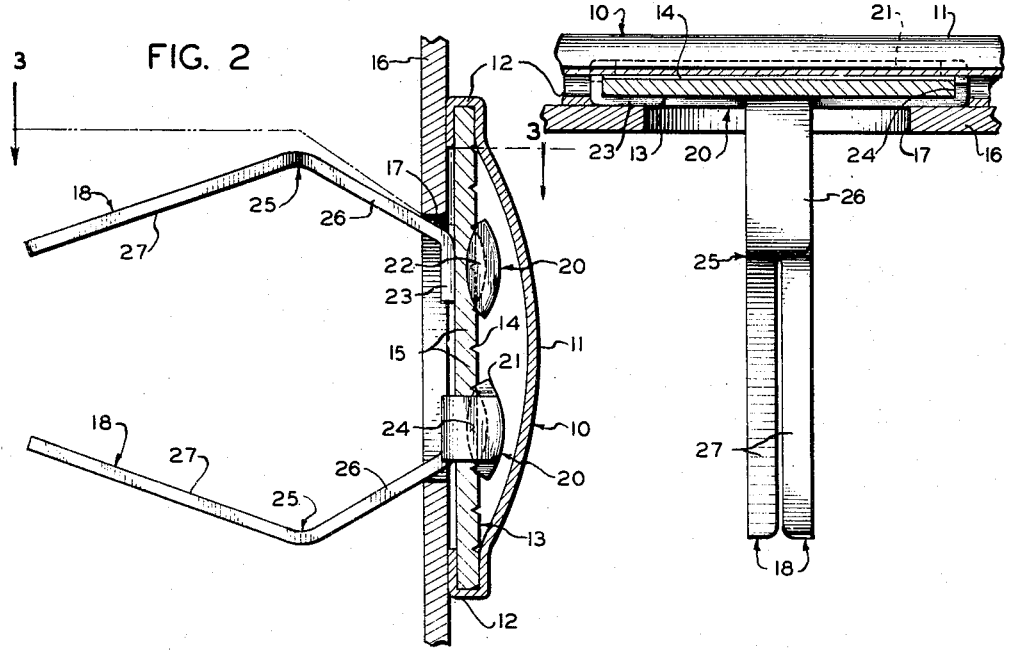
INVENTOR.
C. D. WEST
BY
A. Yates Dowell
ATTORNEY Patented Jan. 20, 1953

2,625,722

UNITED STATES PATENT OFFICE 2,625,722

FASTENER

Charles Dowling West, Orlando, Fla.

Application August 20, 1949, Serial No. 111,365

5 Claims. (Cl. 24—73)

This invention relates to fasteners and more particularly to means for removably securing ornamental trim material to a main structure.

The invention is particularly concerned with the provision of a fastener for attaching trim material to a main structure in which there are one or more spaced apertures adapted to receive a clip member, the fastener being adjustable for use with apertures of various sizes and ornamental material of various sizes.

Heretofore ornamental trim has been attached to a main body by fastening means such as nails, screws, bolts or the like, or by means of fasteners peculiarly adapted for use with the particularly ornamental material to be attached, and to the apertures in the main structure. Fasteners of different types and sizes have usually been needed for use with each of the different types and sizes of trim, and fasteners with different sizes of clips have usually been needed for use with each of the various sizes of apertures, making it necessary for one using ornamental trim to stock a large variety of fasteners to meet his requirements.

An object of this invention is to overcome the disadvantages mentioned and to provide an adjustable fastener for attaching ornamental trim material and the like to a main structure, which fastener may be adjusted for use with trim material of various types and sizes, and which may be adjusted to fit various sizes of apertures.

A further object of this invention is to provide a simple, inexpensive fastener for quickly and firmly attaching various sizes of trim material to main structures.

Another object of this invention is to provide a fastener which is adapted for use with various types and sizes of trim material and for various sizes of apertures, thereby eliminating the necessity of keeping on hand a large stock of fasteners of various types and sizes, and eliminating delays occuring by reason of lack of a proper fastener for the trim and aperture being used.

Further objects and advantages of the invention will be apparent from the following description taken in conjunction with the accompanying drawings, wherein:

Fig. 1 is an exploded perspective illustrating the positioning of the fastener embodying the present invention relative to a length of conventional trim material;

Fig. 2, a partial section showing the parts in operative position; and

Fig. 3, a section on the line 3—3 of Fig. 2.

The adjustable fastener of this invention includes a transverse holding member which is scored or serrated at spaced intervals in order that one or more portions may be easily removed and its length thereby adjusted to fit between the receiving edges of a length of trim. The fastener also includes two identical clips having angularly shaped legs for reception into an aperture in the main structure, the clips having jaw-like clamps for spaced attachment to the transverse member, the spacing depending on the size of the aperture into which the legs are to be sprung.

Referring to the drawings, a length of trim material 10 of conventional design is illustrated which includes a web or sheet member 11 having spaced opposed channel members or flanges 12 which are adapted to receive a portion of the fastener which comprises the embodiment of the present invention.

The fastener includes a substantially flat elongated and preferably rectangular holder or sheet member 13 having a plurality of substantially equi-distantly spaced serrations or scored portions 14 defining a plurality of sections 15. The members 13 are adapted for mass production in various lengths, and sections may easily be broken from the lengths of a size to fit relatively snugly between the opposed channels 12 of the trim material 10. By providing stock material of this kind which is easily adjusted to fit various sizes of trim material it will be appreciated that the necessity of stocking a number of fasteners of various sizes for different sizes of trim materials will be eliminated.

For securing the holder 13 and the trim to which it is attached to a main body 16 having one or more apertures 17, a pair of identical clip members 18 is employed. Each of the clip members comprises a clamp or jaw member 20 having a longer jaw or leg 21 with a flange 22 at its free extremity and having a shorter jaw or leg 23 connected to the longer jaw by web 24, the clip member 18 preferably being constructed of a springy resilient material such as metal or plastic. In order to assist the retention of the jaw on the transverse member 13 the upper jaw member 21 is of curved configuration with its concave side toward the other jaw member 23, the distance between the sides of the curved member being approximately the same distance as the width of two of the sections 15 of the member 13, such that the edges of the member 21 may engage the serrations 14. It is, of course, understood that the jaw members might be constructed to embrace some other number of the serrated portions, two having been found to be convenient however.

Extending at an angle from the jaw member and preferably integral therewith is a leg 25 having an upper portion 26 of substantially the same length and width as the lower jaw member 23 and having a slightly longer portion 27 of preferably decreased width disposed entirely to one side of the plane of the center line of the upper portion 26 of the leg member 25, and at an angle relative to the upper portion. Although the leg portions 26 and 27 are shown as being disposed at an angle of approximately 135° it will be understood that this is not a critical angle and that variations therefrom may be employed.

In the use of the fastener the holder 13 is adjusted in size to fit between the opposed flanges 12 of the trim 10 by removing as many of the portions 15 as is required or by breaking off a correct length from stock material. The clips are then attached to the holder 13 with their jaw members facing in opposite directions such that their leg members diverge from the jaw members as far as the angle connecting leg portions 26 and 27, and then converge toward each other. Since the clips are identical and have the narrowed lower portions 27 of the leg members 25 disposed entirely to one side of the center line of the leg members 25, when the clips are attached to holder 13 with their jaw members facing in opposite directions the lower portions will be on opposite sides of the center line of the upper leg portions 26. The jaws are positioned on the member 13 substantially equidistant from its ends and each other such that the distance between the outside edges of the jaw members is substantially equal to the diameter of the aperture 17 in the body 16 to which the fastener is to be attached. The leg portions 25 of clip members 18 may then be inserted into the aperture 17 which will urge the legs 25 toward each other to permit their reception into the aperture and then permit the legs to return substantially to their normal position as shown in Fig. 2.

It will be appreciated that because the narrowed lower portions 27 of the leg members 25 are on opposite sides of the centerline of the leg members there will be no interference between these portions when legs 25 are moved together preparatory to or during insertion into aperture 17. Less effort is therefore required, since the joint between jaw members 23 and leg portion 26 is the only one flexed.

It will be understood that the invention includes the provision of a fastener which is adapted to attach trim material of various types and sizes to a body or the like in which apertures of various sizes are provided without the necessity of stocking more than two different parts. The fastener itself includes a holder easily adjustable to fit substantially all sizes of trim and includes clip members having means for securely engaging the holder and which may be spaced in accordance with the size of the aperture in the body in order that various size apertures may be accommodated.

It will be obvious to those skilled in the art that various changes may be made in the invention without departing from the spirit and scope thereof, and therefore the invention is not limited by that which is shown in the drawings and described in the specification but only as indicated in the appended claims.

What is claimed is:

1. A fastener for attaching trim material of the type having spaced opposed flange portions to a main body having one or more apertures, comprising a substantially flat sheet member having a plurality of spaced serrations transversely of its length defining portions joined by weakened sections, whereby its length may be reduced if necessary to be received between the flange portions of the trim material, and a pair of identical clips, each having a jaw member adapted to receive the flat member transversely thereof, each of the clips having a curved upper portion with edges at each side of said portion spaced to engage a serration in the flat member, and each having leg members connected to the jaw members, the upper portions of said leg members being angularly disposed from the plane of said jaw members and the lower portions angularly disposed with respect to said upper portion and extending toward the plane of the jaw members, whereby the clips may be separately attached snugly to the flat member with the leg members oppositely bowed and spaced from each other on said flat member according to the size of the aperture which is to receive the leg members.

2. A fastener for attaching trim material of the type having spaced opposed flange portions to a main body having one or more apertures, comprising a substantially flat member having a plurality of serrations transversely of its length, whereby its length may be reduced if necessary to be received between the flange portions of the trim, and a pair of clips each having a jaw member at one end adapted to engage at least one of the serrations in the flat member and having a spaced outwardly bowed leg member connected to the jaw member, whereby the clips may be separately attached to the flat member with the legs oppositely bowed and spaced from each other according to the size of the aperture which is to receive the leg members.

3. For attaching trim material having spaced opposed channel portions to a main body having one or more apertures, a fastener comprising a flat transverse member to be received between said opposed channel portions, a pair of clip members, each clip member having means for attaching said clip to the flat member and each having an outwardly bowed leg member, the lower portions of said leg members being of less width than the upper portions and disposed on opposite sides of the plane of the centerlines of the said upper portions such that interference is prevented between said lower portions when the leg members are moved toward each other preparatory to or during insertion into an aperture, whereby the clip members may be separately attached to the flat member and spaced to permit them to be received into an aperture in a main body.

4. A fastener for securing an element to a body having an opening comprising a serrated member with the serrations spaced longitudinally thereof, said serrated member being of a length to extend across said opening, a pair of resilient clips each having jaws embracing said serrated member, each clip interengaging with at least one of said serrations and adjustable along said serrated member, said clips having legs flaring outwardly from said serrated member so that the legs may be moved together for insertion in said opening and after insertion the fastener will be secured to said body by the reaction of said flaring legs and said serrated member.

5. A fastener for securing an element to an apertured body comprising a first member provided with a plurality of longitudinally spaced serrations, said first member being of a length to extend across an aperture in said body, a plurality of resilient members having means for securement to said first member in positive engagement with said serrations and permitting adjustment of the spacing therebetween, each member of said resilient members having opposed legs extending therefrom so that the legs of each of said resilient members flare away from one another whereby the legs may be moved together for insertion in an aperture in said body and after insertion said fastener will be secured to said body by the reaction of said flaring legs and said first member.

CHARLES DOWLING WEST.

REFERENCES CITED

The following references are of record in the file of this patent:

UNITED STATES PATENTS

| Number | Name | Date |
|---|---|---|
| 958,557 | Stiggleman | May 17, 1910 |
| 1,511,746 | Noll | Oct. 14, 1924 |
| 1,873,871 | Carr | Aug. 23, 1932 |
| 2,012,243 | Jones | Aug. 20, 1935 |
| 2,014,971 | Knutson | Sept. 17, 1935 |
| 2,086,288 | Van Uum | July 6, 1937 |
| 2,165,412 | Place | July 11, 1939 |
| 2,207,374 | Frenberg | July 9, 1940 |
| 2,229,802 | Dyresen | Jan. 28, 1941 |
| 2,275,119 | Wiley | Mar. 3, 1942 |
| 2,557,773 | Steinman | June 19, 1951 |